US010963814B2

(12) United States Patent
Gupta et al.

(10) Patent No.: US 10,963,814 B2
(45) Date of Patent: Mar. 30, 2021

(54) NOISE REDUCTION AND SMART TICKETING FOR SOCIAL MEDIA-BASED COMMUNICATION SYSTEMS

(71) Applicant: Freshworks, Inc., San Bruno, CA (US)

(72) Inventors: Anuj Gupta, Chennai (IN); Saurabh Arora, Chennai (IN); Satyam Saxena, Chennai (IN); Navaneethan Santhanam, Chennai (IN)

(73) Assignee: Freshworks, Inc., San Bruno, CA (US)

( * ) Notice: Subject to any disclaimer, the term of this patent is extended or adjusted under 35 U.S.C. 154(b) by 832 days.

(21) Appl. No.: 15/715,202

(22) Filed: Sep. 26, 2017

(65) Prior Publication Data

US 2019/0026652 A1     Jan. 24, 2019

(30) Foreign Application Priority Data

Jul. 20, 2017   (IN) .............................. 201741025751

(51) Int. Cl.
| | | |
|---|---|---|
| *G06N 20/00* | (2019.01) | |
| *G06N 7/00* | (2006.01) | |
| *G06N 5/02* | (2006.01) | |
| *G06Q 50/00* | (2012.01) | |

(52) U.S. Cl.
CPC ............. *G06N 20/00* (2019.01); *G06N 5/022* (2013.01); *G06N 7/005* (2013.01); *G06Q 50/01* (2013.01)

(58) Field of Classification Search
CPC ...... G06Q 50/01; G06Q 30/016; G06N 7/005; G06N 20/00
See application file for complete search history.

(56) References Cited

U.S. PATENT DOCUMENTS

| | | |
|---|---|---|
| 6,161,130 A | 12/2000 | Horvitz et al. |
| 6,892,189 B2 | 5/2005 | Quass et al. |
| 8,108,323 B2 | 1/2012 | Weinberger et al. |
| (Continued) | | |

OTHER PUBLICATIONS

Rexha, Andi, et al. "Polarity classification for target phrases in tweets: a Word2Vec approach." European Semantic Web Conference. Springer, Cham, 2016. (Year: 2016).*

(Continued)

*Primary Examiner* — Benjamin P Geib
(74) *Attorney, Agent, or Firm* — LeonardPatel P.C.; Michael Aristo Leonard, II; Sheetal Suresh Patel (57) ABSTRACT

A noise reduction and smart ticketing application for social media-based communication systems may identify social media-based communications from users who are attempting to engage with a brand or entity on a social media platform as actionable, and distinguish other communications as noise. The noise reduction and smart ticketing system may use machine learning to determine which social media communications are actionable for a given company or other organization, and generates tickets for actionable communications. Actionable communications may include, but are not limited to, technical support issues, inquiries about a product release date, grievances, incidents, suggestions to improve service, critiques of company policies, etc. Non-actionable communications (i.e., "noise") may include, but are not limited to, suggestions to other users, promotions, coupons, offers, marketing campaigns, affiliate marketing, statements that a user is attending an event, etc.

17 Claims, 10 Drawing Sheets

(56) References Cited

U.S. PATENT DOCUMENTS 10,467,630 B2 * 11/2019 Iyer .................. G06Q 30/016
2016/0196561 A1 7/2016 Iyer et al.

OTHER PUBLICATIONS

Paradis, Rosemary D., et al. "Finding semantic equivalence of text using random index vectors." Procedia Computer Science 20 (2013): 454-459. (Year: 2013).*

Douglas Aberdeen, Ondrej Pacovsky, and Andrew Slater, "The Learning Behind Gmail Priority Inbox," https://static.googleusercontent.com/media/research.google.com/en//pubs/archive/36955.pdf (last accessed Sep. 15, 2017).

Benjamin P Geib, "Non-Final Office Action", issued Sep. 3, 2020, U.S. Appl. No. 15/718,209.

Dhanaraj, S., and V. Karthikeyani. "A study on e-mail image spam filtering techniques," 2013 international conference on pattern recognition, informatics and mobile engineering, IEEE (2013).

* cited by examiner

| Dashboards | Tickets | Social | Solutions | Forums | Customers | Reports | Admin |

Twitter® Tracking

🐦 Bob McLivin

210 — Entity 1

220 — Entity 2

Entity 2

Entity 3

Tickets — 230

Paid for @ENTITY2 expedited security at LGA and am stuck in the regular screening lane... — 248
Glad I paird extra for it. — 240, 242
— 244
⏱ 4 days ago Hey @ENTITY2, free onboard WiFi since my flight is delayed and I'll be in the air when I need to be on the ground with my service?
⏱ 4 days ago @ENTITY2 any idea when January 2018 flights will be available?
⏱ 4 days ago @ENTITY2 So. There seems like a real possibility I'm not getting out of Boston and into Chicago today. What are my options if I get stuck?
⏱ 4 days ago

FIG. 2B

| Dashboards | Tickets | Social | Solutions | Forums | Customers | Reports | Admin |

Twitter® Tracking

🔹 Bob McLivin — 210

Entity 1

Entity 2 — 220

Entity 2

Entity 3

Non-Tickets — 230

Paid for @ENTITY2 expedited security at LGA and am stuck in the regular screening lane.... — 250, 252
Glad I paird extra for it.
🔹 4 days ago — 254 ... 256

Hey @ENTITY2, free onboard WiFi since my flight is delayed and I'll be in the air when I need to be on the ground with my service?
🔹 4 days ago @ENTITY2 any idea when January 2018 flights will be available?
🔹 4 days ago @ENTITY2 So. There seems like a real possibility I'm not getting out of Boston and into Chicago today. What are my options if I get stuck?
🔹 4 days ago

NOISE REDUCTION AND SMART TICKETING FOR SOCIAL MEDIA-BASED COMMUNICATION SYSTEMS

CROSS REFERENCE TO RELATED APPLICATION

This application claims the benefit of Indian Patent Application No. 201741025751 filed Jul. 20, 2017. The subject matter of this earlier-filed application is hereby incorporated by reference in its entirety.

FIELD

The present invention generally relates to content identification, and more specifically, to noise reduction and smart ticketing for social media communication systems via machine learning.

BACKGROUND

Social media communication systems, such a Twitter®, Facebook®, Instagram®, LinkedIn®, Google+®, Google Play® Store, YouTube®, blogs, forums, and the like, are increasingly used by various organizations, such as companies, governmental entities, nonprofit organizations, individuals with a social media following, etc., to connect with their customers or other interested individuals (e.g., individuals interested in a product, following a celebrity, etc.). For instance, users may send relatively short messages to organizations offering comments, requesting assistance, etc. that are monitored by company personnel. This provides interested individuals with an alternative mechanism to communicate with organizations, as opposed to using email, submitting a web form, chat, seeking in-application support, or calling a customer service representative at a call center via telephone.

However, such social media communication systems receive a uniquely high level of "noise" in their communications. As defined herein, "noise" refers to communications where individuals have no intent of engaging with the entity, brand, or individual. For some organizations, such communications can make up 90-95% of the inbound communications that they receive through social media. This hinders the organization's ability to respond quickly to genuine issues its consumers or other interested individuals are experiencing. Accordingly, an improved system and method for reductions of noise received in communications from various social media communication systems may be beneficial.

SUMMARY

Certain embodiments of the present invention may provide solutions to the problems and needs in the art that have not yet been fully identified, appreciated, or solved by conventional social media communication systems. For example, some embodiments pertain to noise reduction and smart ticketing for social media communication systems that identifies social media communications from users who are attempting to engage with a brand or entity on a social media platform as "actionable", and distinguish other communications as "non-actionable," or noise.

In an embodiment, a computer program is embodied on a non-transitory computer-readable medium. The program is configured to cause at least one processor to process a social media communication comprising a plurality of words to convert each of the plurality of words of the communication into a mathematical representation. The computer program is also configured to cause the at least one processor to calculate averaged local and global prediction scores for the mathematical representation of the plurality of words in the social media communication. The computer program is further configured to cause the at least one processor to combine the local and global prediction scores to obtain a single combined value, and predict a class or label of the social media communication using the combined value.

In another embodiment, a computer-implemented method includes calculating, by a computing system, averaged local and global prediction scores for a mathematical representation of a plurality of words in a social media communication. The computer-implemented method also includes combining, by the computing system, the local and global prediction scores to obtain a single combined value S. The computer-implemented method further includes predicting, by the computing system, a class or label of the social media communication using the combined value.

In yet another embodiment, a computer-implemented method includes calculating, by a computing system, averaged local and global prediction scores for a mathematical representation of a plurality of words in a social media communication. The computer-implemented method also includes combining, by the computing system, the local and global prediction scores to obtain a single combined value S and calculating, by the computing system, a probability P using:

$$P = \frac{1}{1+e^{-(a+bS)}}$$

where a and b are both real numbers. The computer-implemented method further includes calculating, by the computing system, the natural logarithm of P÷(1−P) and comparing, by the computing system, the calculated natural logarithm with a threshold to predict the class or label of the social media communication.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to noise reduction and smart ticketing for social media-based communication systems that identifies social media-based communications from users who are attempting to engage with a brand or entity on a social media platform as actionable, and distinguish other communications as noise. The noise reduction and smart ticketing system of some embodiments uses machine learning to determine which social media communications are actionable for a given company or other organization, and generates tickets for actionable communications. As used herein, "actionable" communications refer to those where the interested individual has an intent to engage with the entity or brand. Actionable communications may include, but are not limited to, technical support issues, inquiries about a product release date, grievances, incidents, suggestions to improve service, critiques of company policies, etc. Non-actionable communications (i.e., "noise") may include, but are not limited to, suggestions to other users, promotions, coupons, offers, marketing campaigns, affiliate marketing, statements that a user is attending an event, etc. Some examples of Twitter® tweets that may be actionable to a certain organization are included in Table 1 below.

TABLE 1

EXAMPLE ACTIONABLE TWEETS

Actionable:
@ENTITY When will you guys ship to México?
Pretty sure I'm never ordering from @ENTITY again because in 2016 they still haven't figured out how to ship to Hawaii in a timely fashion.
@ENTITY pretty bad when I walk out after 15 minutes waiting for $.76 change. How do u make millions but don't have $.76 change? Pathetic.
@ENTITY When you open a can that has a huge nail in it. Not okay.
@ENTITY1 FYI I just received what I think is a scam mail from an organization claiming to be you (sponsored by @ENTITY2 & @ENTITY3)

Some examples of Twitter® tweets that may be considered by a certain organization to be noise are included in Table 2 below.

TABLE 2

EXAMPLE NOISE TWEETS

Noise:
ENTITY Happily Ever Excellent Sweepstakes! http://link.com via @USER
Win Glass Sneakers & Vacation Trip With ENTITY Excellent Sweepstakes http://link.com #sneakers #fashion
Want to win a $500 @ENTITY gift card? Enter @USER's Fall Back and Win #sweepstakes today! http://link.com
Only two days left to vote!! Vote now for your favorite entry in the ENTITY Contest! https://link.com It should be noted that while the above examples apply to potentially actionable/non-actionable Twitter® tweets, some embodiments apply to any text-based social media communications. For instance, the following LinkedIn® communication may be considered actionable:

ENTITY needs to understand the fallacies in human interactions. Their staff suggested a product to me. Within 5 minutes of payment, I informed them that this is not what I need. But oh ohhhhhhh . . .

Once your money is with them, it's ONLY their way, ONLY their policy. No refunds, no adjustments, no course corrections allowed. Six days of persistent follow-up from me—TaDa. They have the money now, and they will simply not listen to any request!

Will this be the future as we deal with more and more online companies? It used to be so much easier walking into stores and talking to human beings.

Bye-bye ENTITY. I am going elsewhere, and so will all those who want ETHICS in business.

Facebook® communications may also be processed. For instance, the following post may be considered actionable by many retail entities.

USER NAME I'd love to be swimming in the pool I ordered for my family off of ENTITY's website this weekend. Too bad it never made it today, because the freight company DIDN'T show up!!! (I confirmed the delivery date several days in advance) I was told that "The scheduler was supposed to call you, but he left early today." #thanksforwastingmytime #youhavelostacustomerforlife #ENTITYfail The following Facebook® post may be considered actionable by an auction site entity.

SELLER NAME I am extremely disappointed and upset with ENTITY. I have been a supporter and loyal customer for many years. Check my account.

I recently sold my PRODUCT NAME on ENTITY's website. The buyer had a 100% rating across 7 reviews. I shipped to Ukraine with the shipping information provided on your website. However, I never received payment for PRODUCT NAME.

While the examples herein are in English, in some embodiments, other languages or multiple languages are processed.

It should also be noted that what is considered actionable by one organization may not be considered actionable by another organization. For instance, derogatory complaints may also fall into a gray area between noise and actionable. Some brands/entities/individuals may consider it actionable while others may not. However, this may apply to any category, even if most entities consider it actionable. For instance, a customer may inquire "When will the Mac Pro 15 be available for purchase?" Walmart® may consider this to be noise, whereas Amazon® may consider this to be actionable, or vice versa.

Determinations of whether an item is actionable may be made without using sentiment, which may not be indicative of whether a user intends to engage with an entity or brand. For instance, the tweet "Is the product available?" is neutral in sentiment, but the consumer intends to engage with the brand. As such, this may be considered actionable by many organizations (although some may not wish for this to be actionable). However, consider the case where the consumer tweets "I love this product! The current release is the best I have seen!" While the comments are positive, the user is not actively seeking to engage with the brand. As such, no response from a customer service representative may be required, so the tweet may not be considered actionable (although some brands may wish to respond to positive sentiment in various ways). Thus, some embodiments allow entities and/or brands to customize the communications that they wish to respond to.

In some embodiments, a machine learning algorithm processes communications to obtain a mathematical representation thereof. Local and global prediction scores may be calculated and combined. The class may then be predicted using the combined score (e.g., actionable or noise). If the user corrects the predicted class, the local model is updated. The local prediction score may be recalculated and the process may be run again until the user no longer corrects the predicted class.

Figure 1:
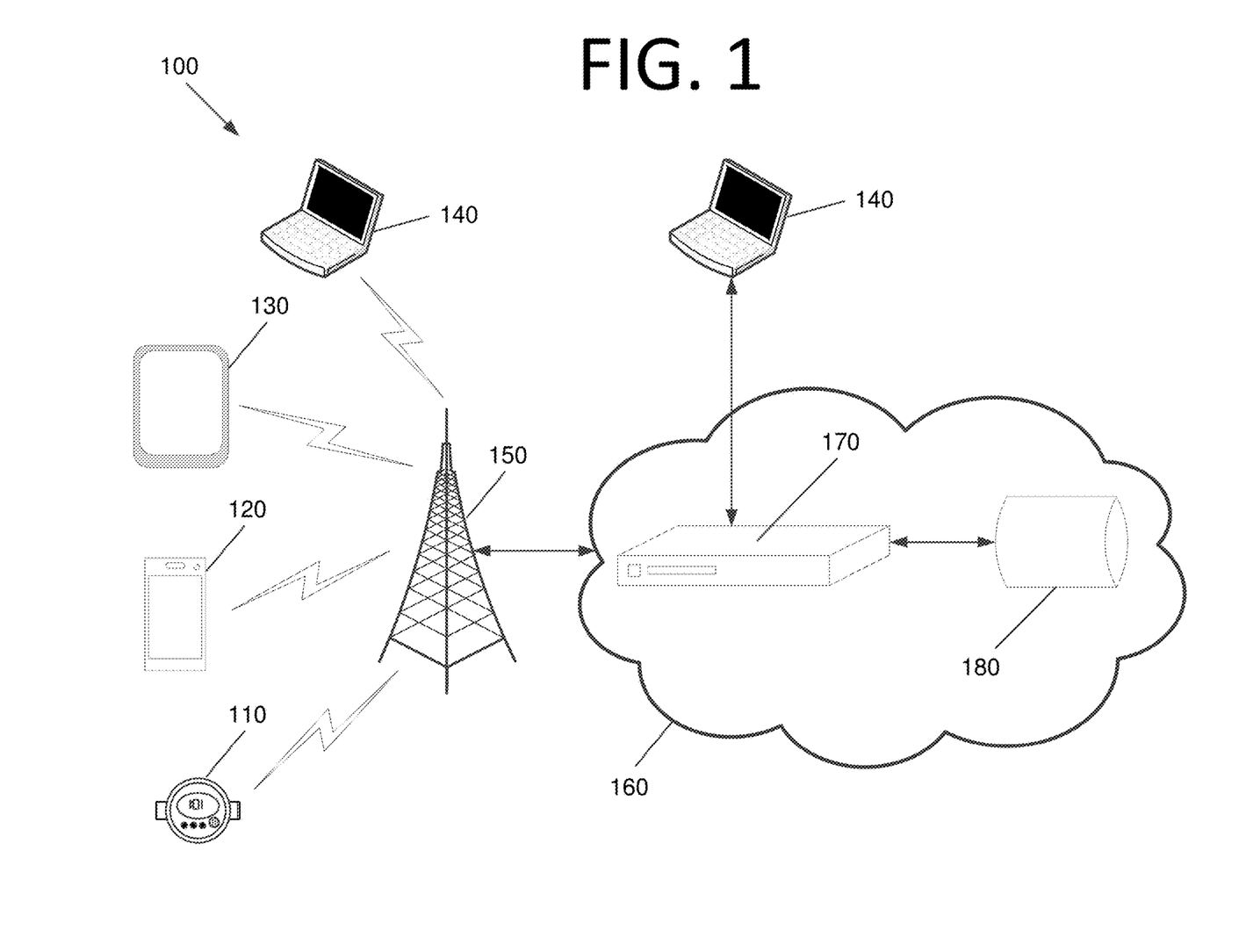
FIG. 1 is an architectural diagram illustrating a system configured to perform noise reduction and smart ticketing, according to an embodiment of the present invention.

FIG. 1 is an architectural diagram illustrating a system 100 configured to perform noise reduction and smart ticketing, according to an embodiment of the present invention. System 100 includes a smart watch 110, a mobile phone 120, a tablet computer 130, a laptop computer 140, a base station 150, the Internet 160, a server 170, a database 180, and a customer service computer 190. While the communications here are shown as wireless for smart watch 110, mobile phone 120, tablet computer 130, and laptop computer 140, in some embodiments, wired communications may also be used for one or more of the communication links. Also, Ethernet, Wi-Fi, Bluetooth™, cable, any other suitable communications technology, or any combination thereof, may be used without deviating from the scope of the invention. Indeed, any local area network (LAN), wide area network (WAN), or Internet technology may be used supplemental to, or in place of, the network depicted herein.

Users of smart watch 110, mobile phone 120, tablet computer 130, and laptop computer 140 (e.g., social media users that are interested individuals with respect to an entity or brand) use a social media application running thereon. The social media application may be custom-tailored for the specific hardware capabilities, display constraints, etc. of each device. In FIG. 1, smart watch 110, mobile phone 120, tablet computer 130, and laptop computer 140 communicate with the Internet 160 via base station 150. Base station 150 communicates with the Internet 160 via a telecommunications network, which may be any suitable telecommunications network, such as those of any currently available commercial carrier or combination of carriers. The telecommunications network may utilize any suitable standards and technologies, such as enhanced Node Bs, Radio Network Controllers (RNCs), 3G, 4G, 5G, etc. For the sake of convenience, the details of the telecommunications network are not shown, and the details of the Internet 160 are abstracted here, but may have any desired architecture without deviating from the scope of the invention.

Within or otherwise accessible by the Internet 160 is a server 170 that runs a noise reduction and smart ticketing application. For instance, the noise reduction and smart ticketing application may use machine learning to determine whether a given social media communication is noise or an actionable item with respect to a given organization (or brand). This provides a level of "personalization", where the application will learn what is considered actionable to the entity or brand and what is not on a per-entity/brand basis. The noise reduction and smart ticketing application may store/update various metrics with respect to the social media communication, entity, individual, and/or brand in a database 180, and may generate tickets for actionable items. Actionable items for a given user, such as a customer service representative or an individual monitoring his or her own inbound social media communications may be accessed and viewed via computer 190, which is running smart ticketing software. As used herein, "smart ticketing software" refers to software that classifies the incoming social media communications as noise or actionable, and allows a user to review social media communications and indicate whether categorization thereof was incorrect.

Figure 2A:
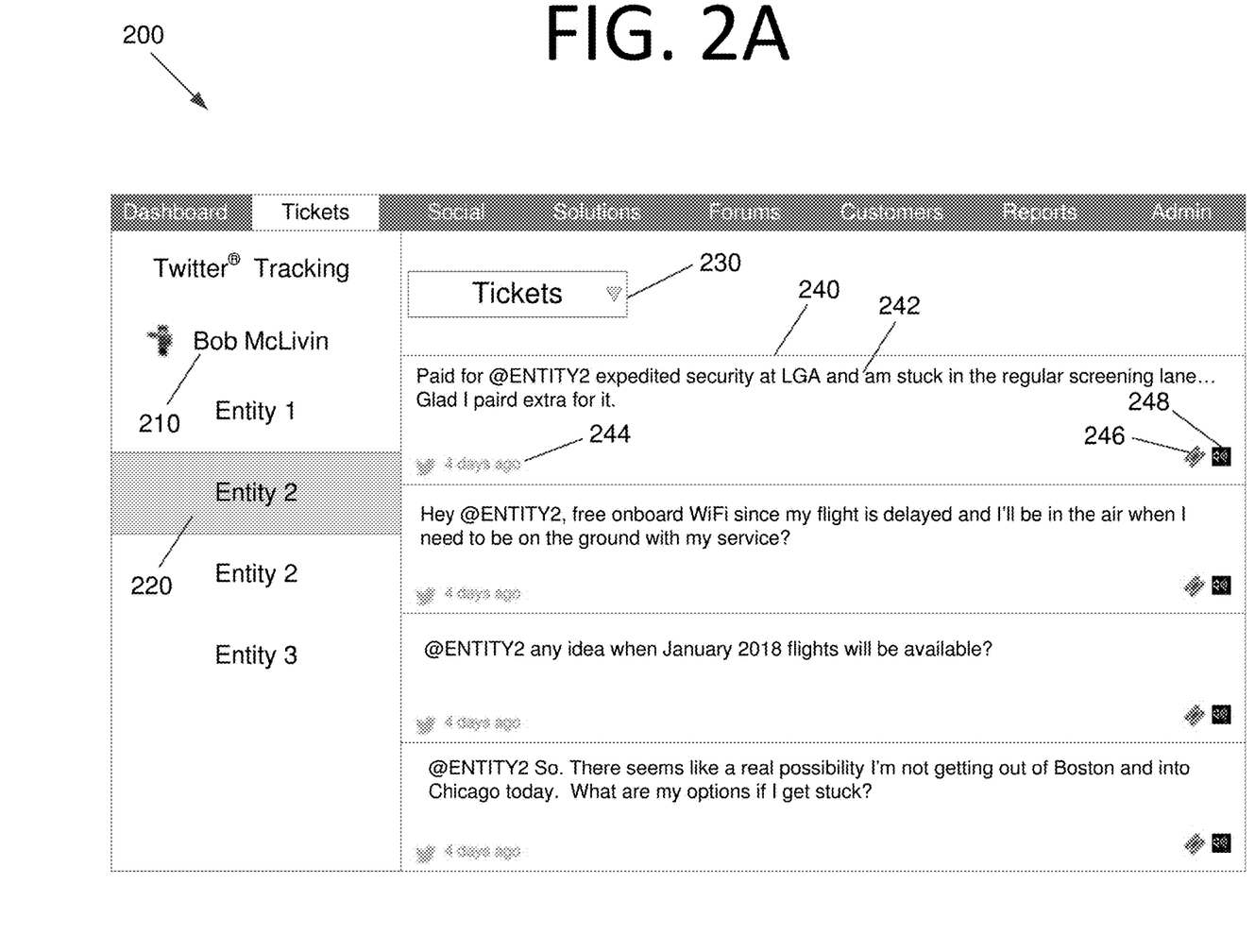
FIG. 2A is a screenshot illustrating a ticket management interface displaying actionable tweets, according to an embodiment of the present invention.

Per the above, tickets may be generated for actionable communication and assigned to a customer support representative. FIG. 2A is a screenshot illustrating a ticket management interface 200 displaying actionable tweets, according to an embodiment of the present invention. Ticket management interface includes an identification of a current customer support user 210 and an entity list 220 of entities that the customer support representative may manage. Here, the user has selected Entity 2.

By selecting options in a dropdown menu 230, the user can select whether to display tweets for which tickets have been generated (i.e., actionable tweets), as in FIG. 2A. The user can also use dropdown menu 230 to view non-tickets (i.e., noise). For each actionable tweet 240, text 242 and a date/time 244 are shown. By clicking on ticket icon 246, an interface may open that allows the user to respond to the tweet (e.g., communicate with the user, contact technical support, etc.). Once the user has addressed the ticket, the user may indicate that the tweet has been resolved, and actionable tweet 240 may be removed from the user's queue.

Per the above, some embodiments employ machine learning to determine which text in social media communications is likely to be considered actionable and which are likely to be considered noise. If the noise reduction and smart ticketing system includes a noise tweet in the actionable tweets, the user may click noise button 248 to cause the system to remove the tweet from the actionable items and flag it as noise. The noise reduction and smart ticketing system may also modify a local model in an attempt to more accurately distinguish noise from actionable text in social media communications in the future.

Figure 2B:
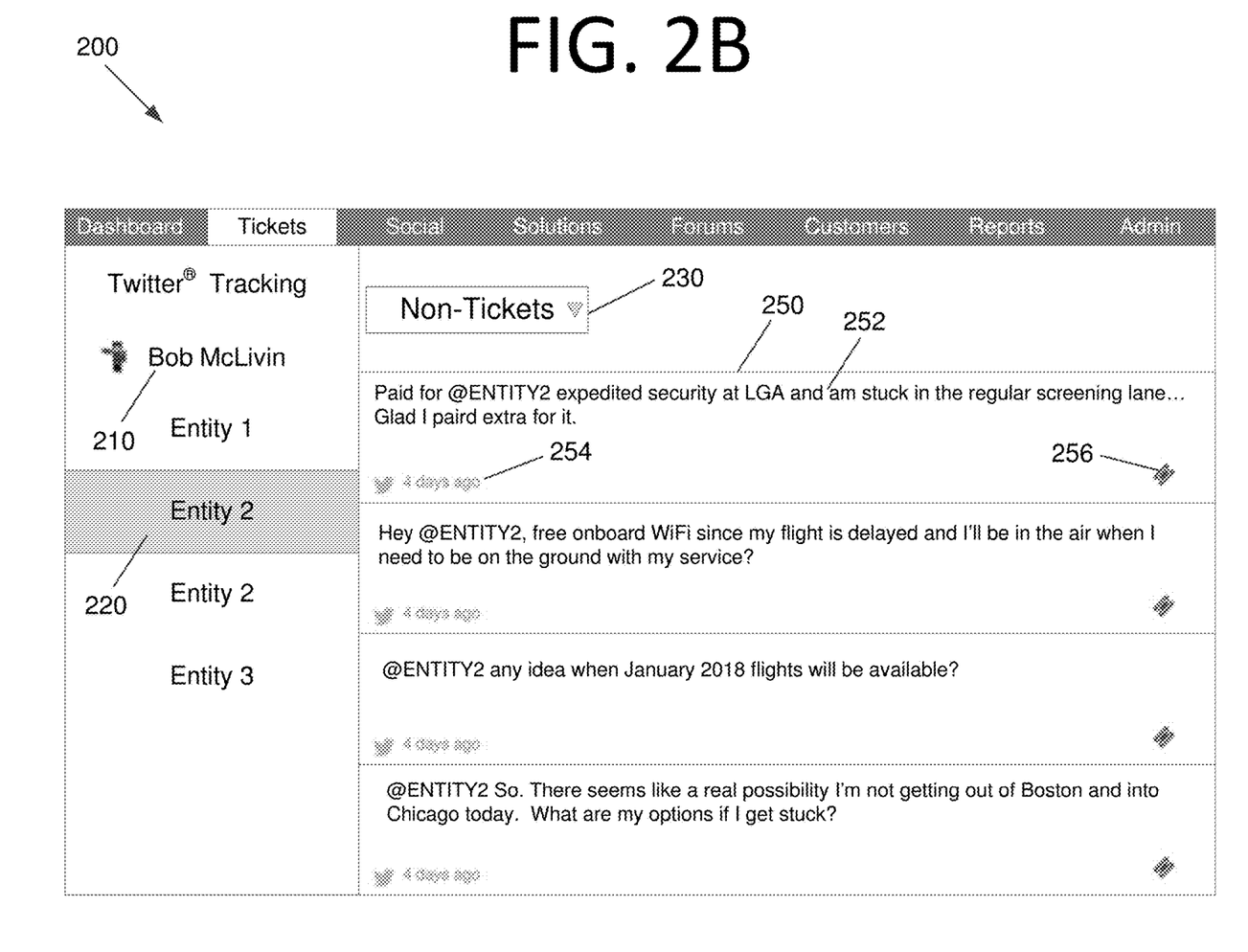
FIG. 2B is a screenshot illustrating the ticket management interface displaying noise tweets, according to an embodiment of the present invention.

Turning to FIG. 2B, noise tweets 250 are shown. Noise tweets 250 include text 252 and a date/time 254. Just as there may be instances where noise tweets are flagged as actionable, there may also be instances where the noise reduction and smart ticketing system incorrectly flags actionable tweets as noise. In this case, the user may click ticket icon 256, which causes the system to remove the tweet from the noise items and flag it as actionable. The noise reduction and smart ticketing system may also modify the local model in an attempt to more accurately distinguish actionable tweets from noise in the future.

It should be noted that FIGS. 2A and 2B are provided by way of example only. Any suitable interface may be used without deviating from the scope of the invention. Also, any text-based social media communications may be monitored—not just tweets. In the case that a social media communication includes content other than text (e.g., images, videos, etc.), this content may be disregarded, and text included in the communication (if any) may be processed.

Figure 3:
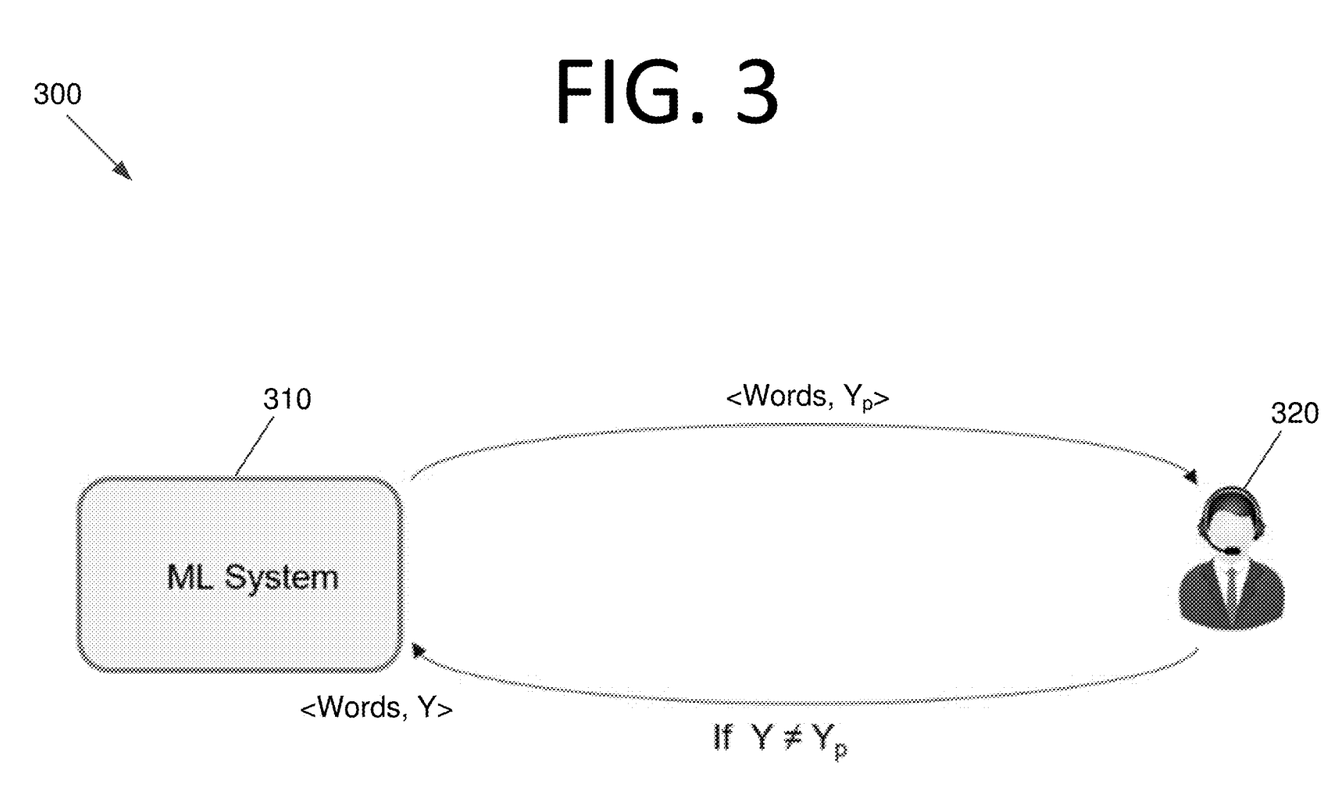
FIG. 3 is a flow diagram illustrating interactions between a machine learning system and a user, according to an embodiment of the present invention.

Some embodiments of the present invention employ a classifier/regressor that learns which tweets are actionable and which are not for various organizations and/or brands. FIG. 3 is a flow diagram 300 illustrating interactions between a machine learning (ML) system 310 and a user 320, according to an embodiment of the present invention. Upon receiving a social media communication, ML system 310 classifies the communication as actionable or noise using a binary classifier variable for the communication, $Y_p$. If the communication is actionable, $Y_p$ may be set to 1, and if the communication is not actionable, $Y_p$ may be set to 0, for instance. However, this could be reversed in some embodiments, or handled in any other suitable manner such that actionable communications may be distinguished from noise.

In this embodiment, user 320 then reviews the communication and determines whether ML system 310 has classified it correctly. If the classification is correct, no feedback is provided to ML system 310, which may assume that the classification is correct. However, if the classification is incorrect, ML system 310 is informed, and it updates a local model so that future classification may be more accurate for the organization or brand. ML system 310 may then perform classification again and continue the process until user 320 no longer corrects the classification. Alternatively, ML system 310 may sufficiently modify the local model of the communication until the correct value of $Y_p$ is obtained, or make an incremental modification and move on.

Figure 4:
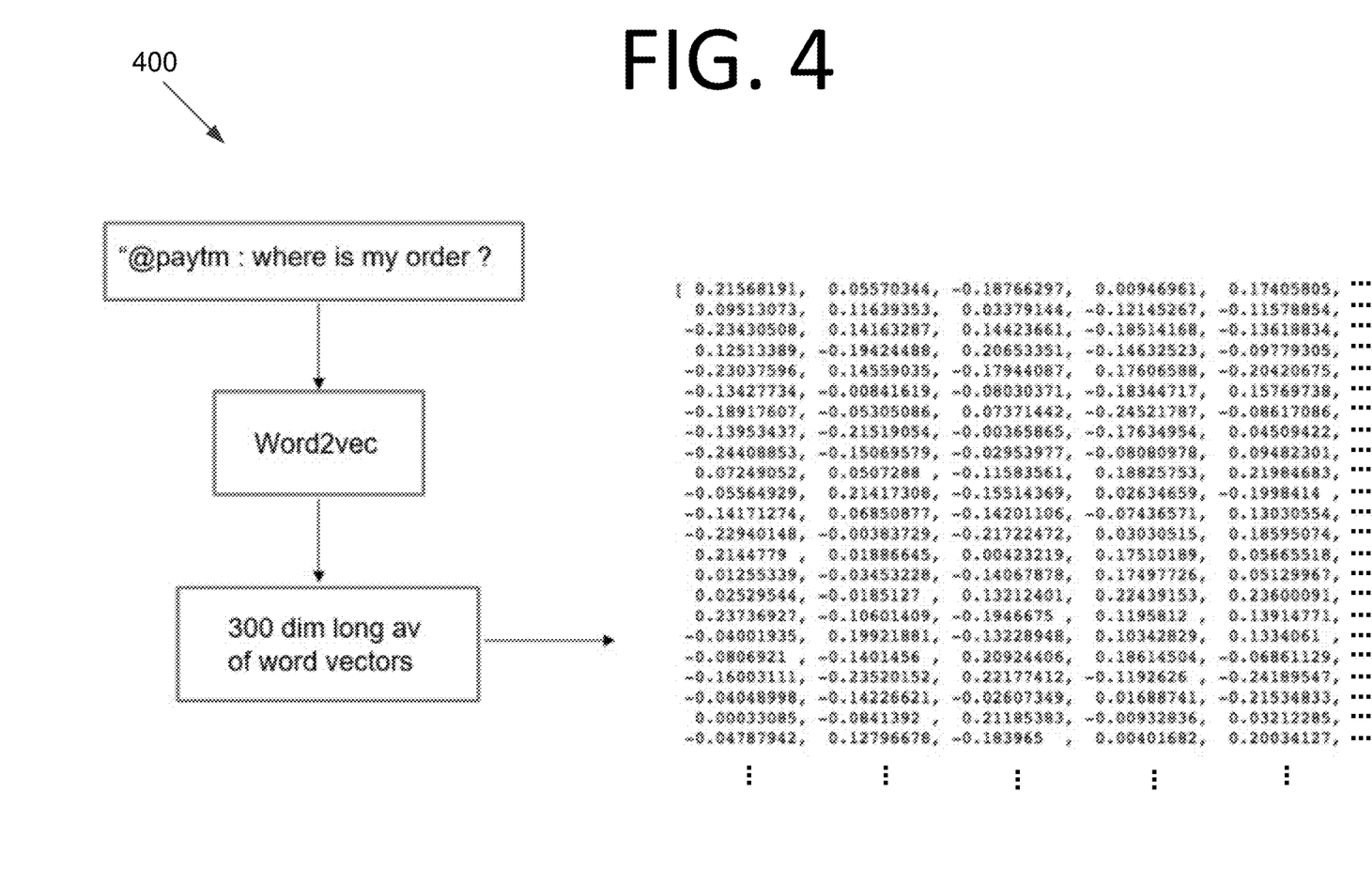
FIG. 4 illustrates a workflow for converting text to numbers, according to an embodiment of the present invention.

FIG. 4 illustrates a workflow 400 for converting text to numbers, according to an embodiment of the present invention. In this embodiment, Word2vec is used, but any suitable mathematical representation of words may be used without deviating from the scope of the invention. For instance, GloVe, FastText embeddings, a custom dictionary, or any other suitable dictionary of word mappings to mathematical representations may be used. The dictionary may work for any desired language, and in certain embodiments, may be multilingual.

First, the sentence "@paytm: where is my order?" is parsed into individual words—i.e., paytm, where, is, my, order. Superfluous characters and numbers (e.g., @, :, ?, etc.) may be removed. Word2vec is then used on each word to obtain a mathematical representation thereof. However, per the above, this may be any suitable dictionary in some embodiments. Word2vec includes a dictionary with approximately two million words, and is thus quite robust. Individual words are represented by 300 real numbers. The values of the numbers may be selected such that words that share common contexts in the corpus are "located" in close proximity to one another in the vector space. However, in other embodiments, the numbers may be arbitrary real numbers. More specifically, each word is converted into a 300 dimension-long word vector, and the word vectors for all words in the sentence are averaged, summed, weighted, concatenated, etc. to obtain a 300 dimension-long representation of the word vectors. In other embodiments, any desired number of dimensions may be used (e.g., 25, 50, 100, 200, 600, etc.) without deviating from the scope of the invention. The final representation vector is obtained by adding the five vectors (along with each dimension) and then dividing them by 5. In certain embodiments, the final vector may be obtained using more complex approaches, such as sum, weighted sum, concatenation, etc. In the event that a word is not included in the Word2vec dictionary, it may be ignored. However, in other embodiments, a random representation may be generated on the fly when the word is not included in the dictionary.

Figure 5:
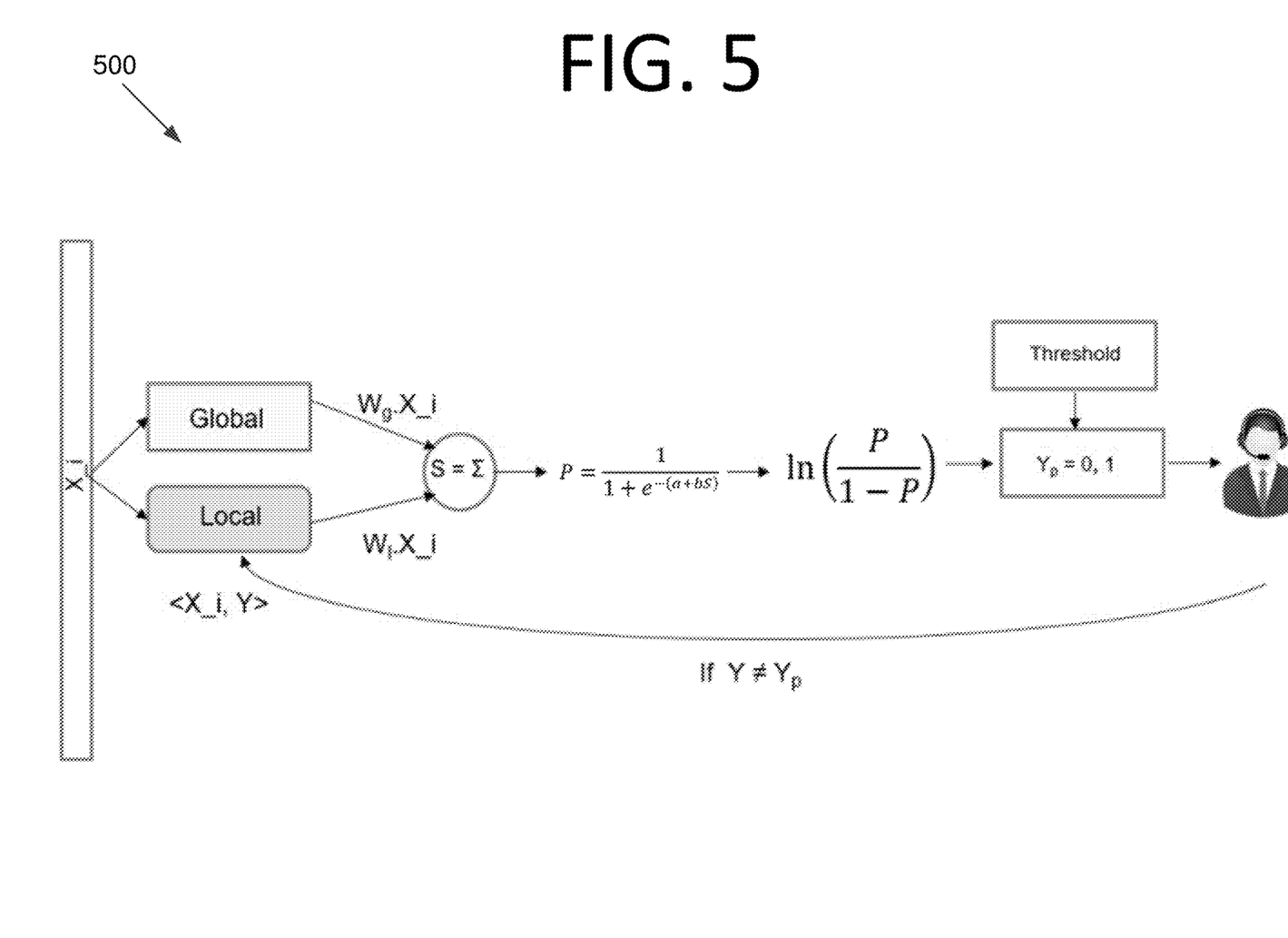
FIG. 5 illustrates a workflow for deriving a prediction from word vectors from a communication, according to an embodiment of the present invention.

FIG. 5 illustrates a workflow 500 for deriving a prediction from word vectors from a communication, according to an embodiment of the present invention. The 300 dimension-long average of the word vectors is represented herein as X_i. Global model weight values and local model weight values of the words will initially be the same prior to training the system. In other words, before the local values undergo incremental updates based on indications from a user that classifications are incorrect, the global values and the local values are the same. The global score (dot products of the global model weight values and the text representation vector, $W_g \cdot X\_i$) and the local score (averaged local values for each word, $W_g \cdot X\_i$) are then obtained and summed to obtain a single real number, S. However, in other embodiments, more complex approaches to combining the global and local scores may be applied, such as a weighted sum, product, fractions, exponentiation, logs, product of logs, etc.

Once S is obtained, a probability P is then calculated using:

$$P = \frac{1}{1 + e^{-(a+bS)}} \quad (1)$$

In some embodiments, the values of a and b are both 1. However, these values may differ in some embodiments.

Once P is obtained, the natural logarithm of P±(1−P) is obtained (the natural logarithm of e is 1). This is then compared with a threshold to determine whether the value of $Y_p$ should be set to 1 (actionable) or 0 (noise). For example, if the natural logarithm value is 0.65 and the threshold is 0.61, the communication is determined to be actionable and $Y_p$ is set to 1. If, upon review, a user determines that the classification was incorrect, the system is notified and the local model and/or threshold is updated. The algorithm is run again until the correct classification is obtained.

In some embodiments, the updates of the 300 numbers in the local model may be performed as follows. Let $w_1, w_2, \ldots, w_{300}, w_{301}$ be the weights of the local model. Each weight may be updated using the following equation:

$$w_i = w_i + f_i \frac{\text{sign}(E)(\max(|E|, 0))}{\|f\|^2 + 1/2C} \quad (2)$$

where $f_i$ is the $i^{th}$ value of the final text vector, C is a parameter (set to 1.0 in some embodiments), $\|f\|$ is the norm of the final text vector, and E is the error between P and the actual label (here, 0 for noise and 1 for actionable).

However, it should be noted that other formulations may be used in some embodiments, such as:

$$w_i = w_i + f_i \left( \frac{|E|}{\|f\|^2} \right) \quad (3)$$

$$w_i = w_i + f_i \left( \frac{\min(C, |E|)}{\|f\|^2} \right) \quad (4)$$

$$w_i = w_i + f_i \left( \frac{E}{\|f\|^2 + \frac{1}{2C}} \right) \quad (5)$$

Figure 6:
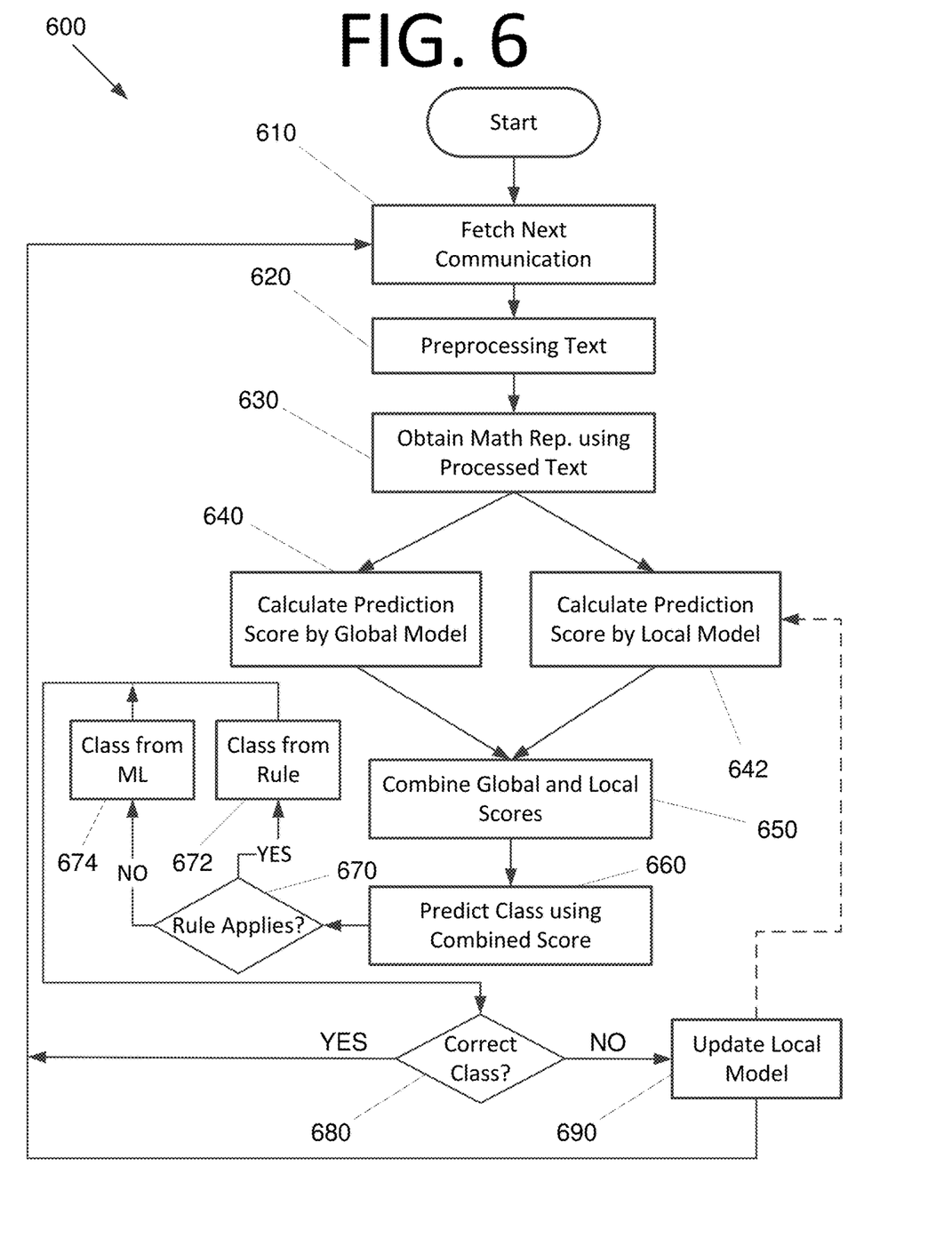
FIG. 6 is a flowchart illustrating a process for classifying social media communications, according to an embodiment of the present invention.

FIG. 6 is a flowchart 600 illustrating a process for classifying social media communications, according to an embodiment of the present invention. The process begins with fetching the next social media communication (e.g., a tweet) at 610 and preprocessing the text at 620. Preprocessing may include processing semantic features in the text, for instance.

A mathematical representation of the text is then obtained using the processed text at 630. In some embodiments, this may be done using the algorithm described with respect to FIGS. 4 and 5. Prediction scores (e.g., classification/regression scores) are then calculated for a global and local model at 640 and 642, respectively. The global and local scores are combined at 650. The class/label is then predicted at 660.

In some instances, it may be beneficial to be able to automatically override the classification process when certain words and/or phrases are present in the social media communication. When such words/phrases are found, their presence may result in a fixed classification (e.g., actionable/noise) regardless of the prediction from the ML module. For example, airlines may want social media communications including the word "bomb" to always be marked as actionable, even if the communication would otherwise be identified as noise. Similarly, taxi service companies may wish for communications with words such as "misbehave" or "assault" to always be actionable.

Certain words or phrases may cause a communication to always be classified as noise. For instance, many brands do not consider communications with profanity or racist words to be actionable. As such, if an incoming communication contains such words, it may be flagged as noise even if the communication would otherwise be considered actionable.

In FIG. 6, these "override" words and phrases are accommodated. If an override rule is present, and one or more override words and/or phrases are present in the text that trigger the rule, at 670, the class is set to the class/label from the rule at 672. However, if the rule is not triggered at 670, the class is set to the class predicted using ML (i.e., from the combined score) at 674.

If the correct class/label is predicted at 680, the process returns to step 610 to fetch the next communication. However, if the correct class/label is not predicted at 680, the local model may be updated at 690, and the process may return to step 640 with an incrementally updated local model. However, in some embodiments, this may not be the case. This process may be iteratively run until the correct class/label is predicted.

Figure 7:
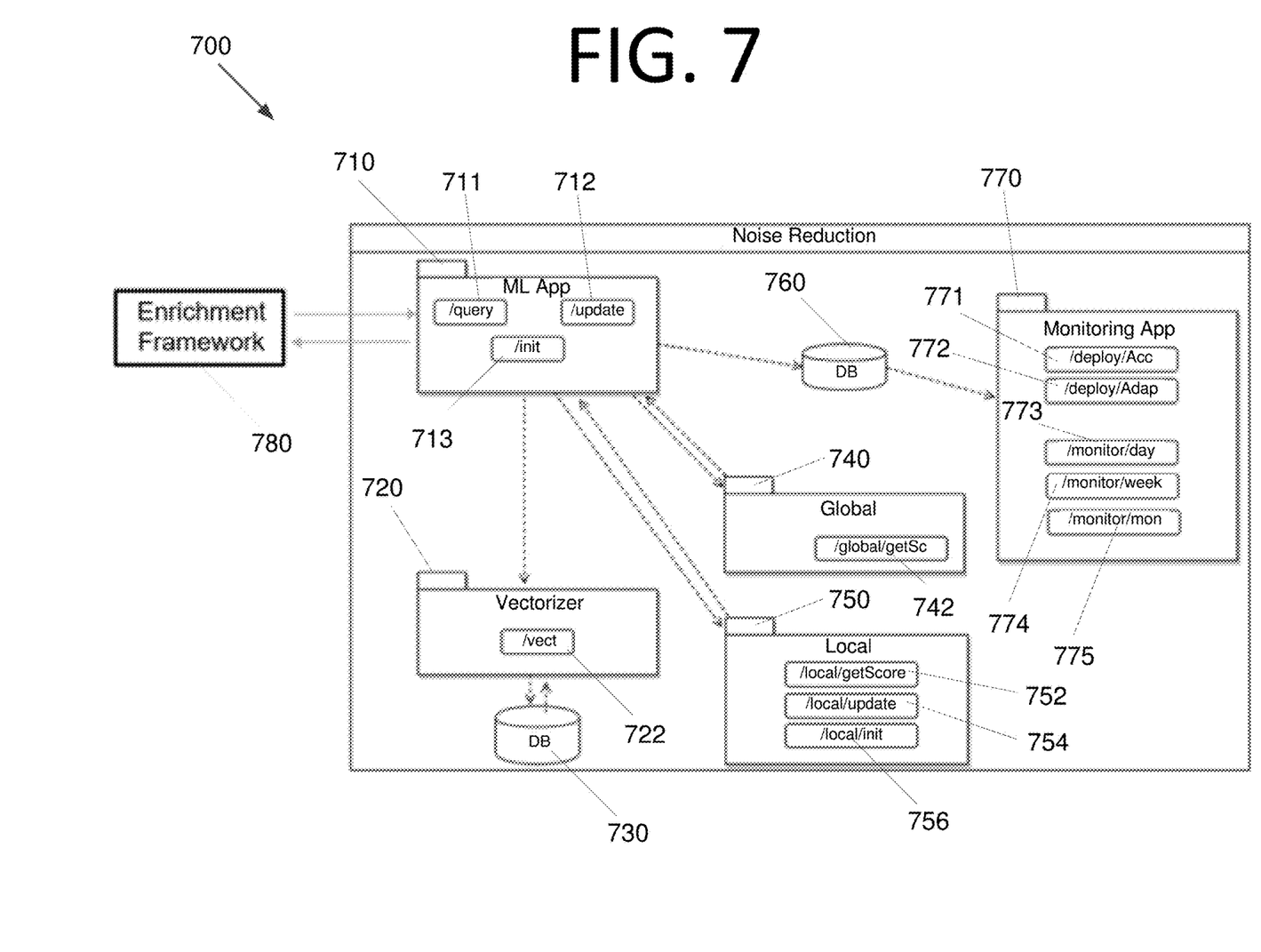
FIG. 7 is an architectural diagram illustrating a noise reduction application, according to an embodiment of the present invention.

FIG. 7 is an architectural diagram illustrating a noise reduction application 700, according to an embodiment of the present invention. The architecture may be readily scalable in some embodiments, and each component may be used as an independent application programming interface (API) for future reuse. Noise reduction application 700 includes an ML application 710 that receives a payload from an enrichment framework 780 and calls the appropriate services. Enrichment framework 780 provides social media communications to be processed by ML application 710. Enrichment framework 780 may "enrich" the actual text by providing an indicator of actionability, for example. ML application 710 also assembles responses, prepares the result, and returns the responses. The result may be 0 for noise and 1 for actionable, for instance. ML application 710 logs payload and responses in a database 760. Database 760 serves as a data store to monitor the performance of the model.

ML application 710 includes three functions—query 711, update 712, and init 713. All of these functions are synchronous in this embodiment. query 711 may query enrichment framework 780 to get the class label, update 712 may update the local model when the user marks text for correction, and init 713 may instantiate and initialize a local model when an entity or brand onboards the system.

A vectorizer 720 receives communications from ML application 710 and provides a mathematical representation of the text thereof via a vectorizer function 722. Vectorizer 720 may perform preprocessing (i.e., processing semantic features in the text), fetch word vectors, and combine the word vectors to obtain a single 300 dimension vector as a representation of the text.

In the case of Word2vec (W2V), a single W2V file may require approximately 4.5 gigabytes (GB) of random access memory (RAM), which is relatively expensive. Accordingly, in this embodiment, the <word:vector> pairs are stored in a redistribution database 730. W2V is case-sensitive, so the vector for the word "Great" may exist, but the vector for "great" may not. As such, querying the model for "great" would give a "miss" in this case. In order to improve the likelihood of "hits", case matching may be applied to find the correct vector. In order to improve query time, a cache may be included in addition to redistribution database 730.

Noise reduction application 700 includes a global model 740 with a getScore function 742 that takes a 300 dimension vector and provides a score for it. Logistic regression may be used to provide good values for global weights and parameters.

A local model 750 includes three synchronous functions in this embodiment—getScore 752, update 754, and init 756. When init 756 is used for local model 750, it sets the weights/parameters of the local model equal to the weights/parameters of global model 740. As update 754 is called, these local weights are modified using Eq. (2), (3), (4), or (5). The getScore function 742 that takes a 300 dimension vector and provides a score for it.

To make the model light in some embodiments, rather than using the ML library/packages, equations of local model 750 are implemented directly in its code. For example, some embodiments use an algorithm called "Passive-Aggressive" (PA). One implementation thereof is available in a package called Scikit. The PA algorithm, via Scikit, takes ~3 MB. Those equations were implemented directly in the code (sans the package), which reduced the size to approximately ~2.3 KB. As such, 1,000 local models may require only approximately 2.2. megabytes (MB). Updating of local model 750 when feedback is provided may be accomplished via a simple queue service (SQS) queue, making updates asynchronous. More specifically, this makes update 754 an unblocking call( ) thus increasing the availability of the model.

Monitoring application 770 is used to monitor the performance of the whole system. Monitoring application 770 may compute accuracy of incoming data over an arbitrary interval for one or more entities/brands. For instance, this monitoring may be performed daily 773, weekly 774, monthly 775, or over any desired time period without deviating from the scope of the invention. Acc 771 gives the deployment accuracy at the time of deployment to system 700. Adap 772 gives adaptation accuracy, which measures how the accuracy improves as the local model is updated and applied. Acc 771 and Adap 772 may be used for benchmarking once system 700 is deployed.

Figure 8:
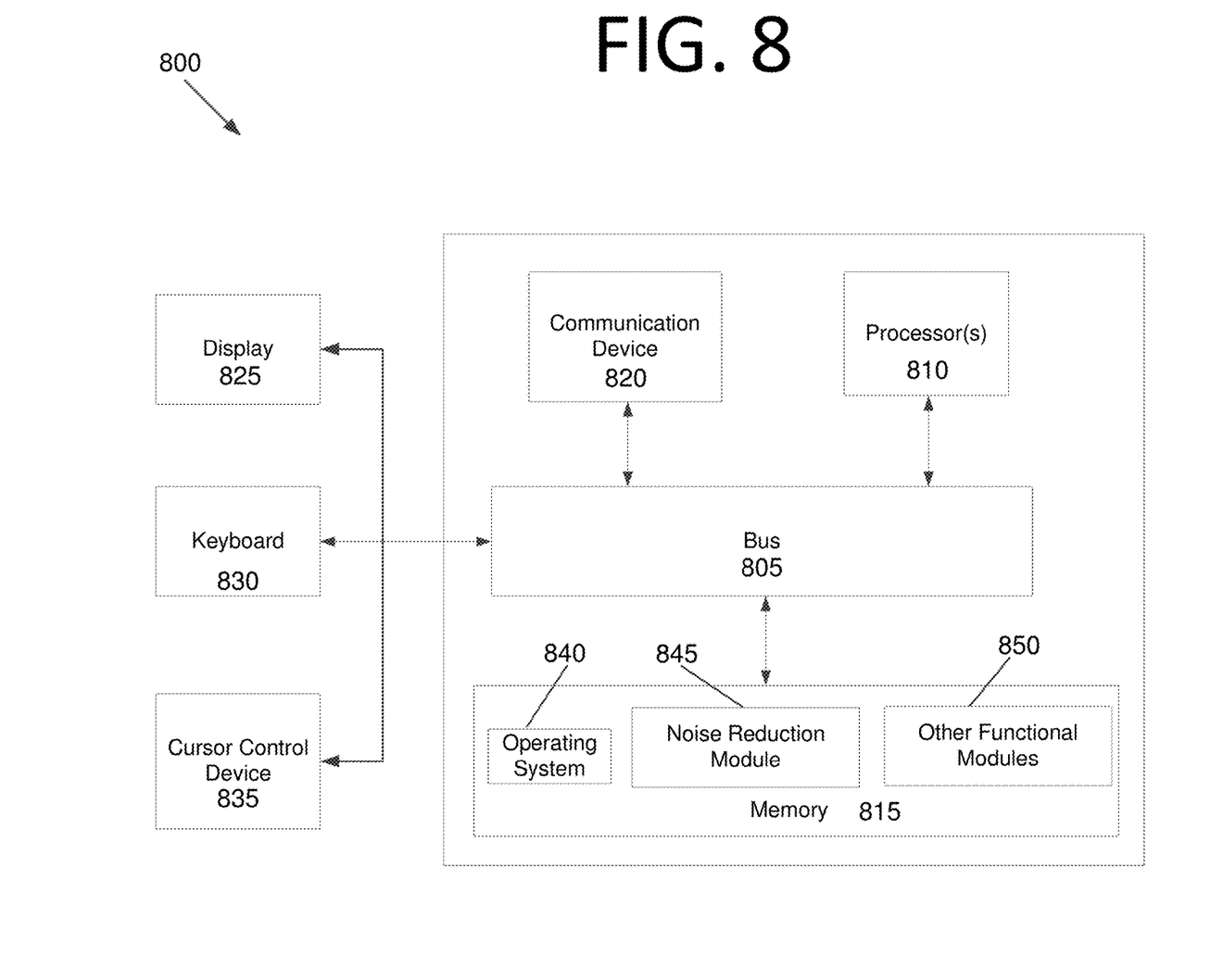
FIG. 8 is a block diagram illustrating a computing system configured to perform noise reduction and smart ticketing, according to an embodiment of the present invention.

FIG. 8 is a block diagram illustrating a computing system 800 configured to perform noise reduction and smart ticketing, according to an embodiment of the present invention. Computing system 800 includes a bus 805 or other communication mechanism for communicating information, and processor(s) 810 coupled to bus 805 for processing information. Processor(s) 810 may be any type of general or specific purpose processor, including a central processing unit (CPU) or application specific integrated circuit (ASIC). Processor(s) 810 may also have multiple processing cores, and at least some of the cores may be configured to perform specific functions. Computing system 800 further includes a memory 815 for storing information and instructions to be executed by processor(s) 810. Memory 815 can be comprised of any combination of RAM, read only memory (ROM), flash memory, cache, static storage such as a magnetic or optical disk, or any other types of non-transitory computer-readable media or combinations thereof. Additionally, computing system 800 includes a communication device 820, such as a transceiver and antenna, to wirelessly provide access to a communications network.

Non-transitory computer-readable media may be any available media that can be accessed by processor(s) 810 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 810 are further coupled via bus 805 to a display 825, such as a Liquid Crystal Display (LCD), for displaying information to a user. A keyboard 830 and a cursor control device 835, such as a computer mouse, are further coupled to bus 805 to enable a user to interface with computing system. However, in certain embodiments such as those for mobile computing implementations, a physical keyboard and mouse may not be present, and the user may interact with the device solely through display 825 and/or a touchpad (not shown). Any type and combination of input devices may be used as a matter of design choice.

Memory 815 stores software modules that provide functionality when executed by processor(s) 810. The modules include an operating system 840 for computing system 800. The modules further include a noise reduction module 845 that is configured to perform noise reduction and smart ticketing functionality in accordance with the embodiments discussed herein. Computing system 800 may include one or more additional functional modules 850 that include additional functionality.

One skilled in the art will appreciate that a "system" could be embodied as an embedded computing system, a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 9:
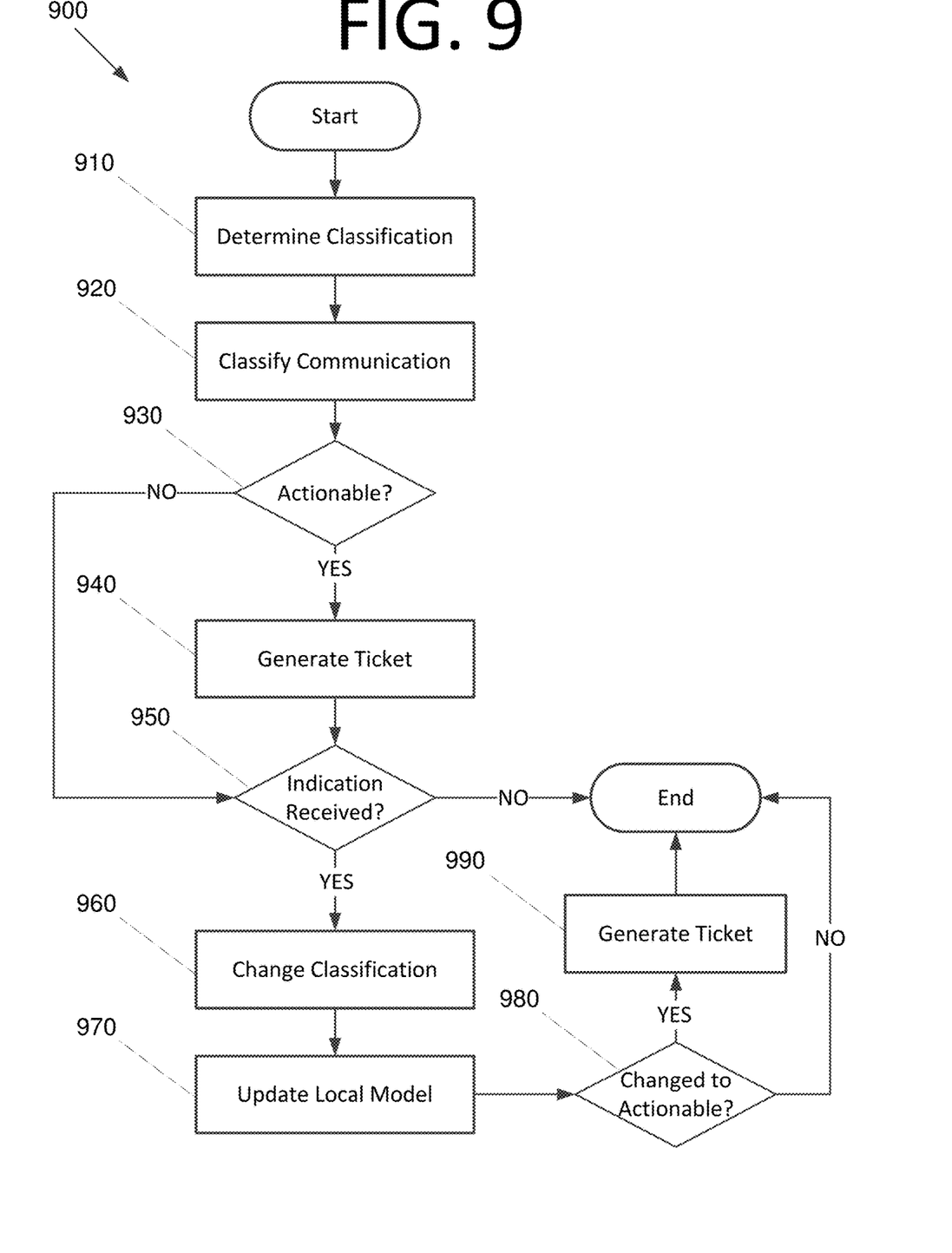
FIG. 9 is a flowchart illustrating a process for personalizing classifications for a given entity or brand, according to an embodiment of the present invention.

FIG. 9 is a flowchart 900 illustrating a process for personalizing classifications for a given entity or brand, according to an embodiment of the present invention. The process begins with determining whether a social media communication should be classified as actionable for an entity or a brand via a machine learning algorithm at 910. The social media communication is then classified as actionable or noise at 920. If the social media communication is not actionable at 930, the process proceeds to step 950.

However, if the social media communication is actionable at 930, a ticket is generated in a smart ticketing application at 940. The machine learning algorithm may be configured to learn what is actionable for the entity or brand based on incorrect classifications of actionable social media communications, thus personalizing the determination of actionable social media communications to the entity or brand.

If the social media communication was classified correctly, no further indication may be received from the smart ticketing application at 950 and the process may be complete for that communication. However, if an indication is received at 950 from the smart ticketing application that the social media communication was incorrectly classified as actionable or noise, the classification may be changed to the correct classification at 960. In other words, the user may indicate that an actionable communication is actually noise, or vice versa.

The local model may then be updated for the entity or brand at 970 based on the correct classification. In some embodiments, the updating of the local model includes recalculating averaged local and global prediction scores for words in the social media communication using the updated local model and a global model. In certain embodiments, the local model may be updated and the averaged local and global prediction scores may be recalculated using the updated local model and the global model until the predicted classification is correct. If the classification was changed to actionable at 980, a ticket is generated at 990.

The process steps performed in FIGS. 6 and 9 may be performed by a computer program, encoding instructions for the nonlinear adaptive processor to perform at least the processes described in FIGS. 6 and 9, in accordance with embodiments of the present invention. The computer program may be embodied on a non-transitory computer-readable medium. The computer-readable medium may be, but is not limited to, a hard disk drive, a flash device, RAM, a tape, or any other such medium used to store data. The computer program may include encoded instructions for controlling the nonlinear adaptive processor to implement the processes described in FIGS. 6 and 9, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
    calculating, by a computing system, averaged local and global prediction scores for a mathematical representation of a plurality of words in a social media communication;
    combining, by the computing system, the local and global prediction scores to obtain a single combined value S;
    calculating, by the computing system, a probability P using:

$$P = \frac{1}{1 + e^{-(a+bS)}}$$

where a and b are both 1; and
    predicting, by the computing system, a class or label of the social media communication using the combined value.

2. The computer-implemented method of claim 1, wherein when the predicted class or label is incorrect, the method further comprises:
    updating a local model, by the computing system; and
    recalculating, by the computing system, the averaged local and global prediction scores using the updated local model and a global model.

3. The computer-implemented method of claim 2, further comprising:
    updating, by the computing system, the local model and recalculate the averaged local and global prediction scores using the updated local model and the global model until the predicted class or label is correct.

4. The computer-implemented method of claim 2, wherein the local model is updated by updating each weight of the local model using one of the following equations:

$$w_i = w_i + f_i \frac{\text{sign}(E)(\max(|E|, 0))}{\|f\|^2 + 1/2C}$$

$$w_i = w_i + f_i \left( \frac{|E|}{\|f\|^2} \right)$$

$$w_i = w_i + f_i \left( \frac{\min(C, |E|)}{\|f\|^2} \right)$$

$$w_i = w_i + f_i \left( \frac{E}{\|f\|^2 + \frac{1}{2C}} \right)$$

where $f_i$ is an $i^{th}$ value of a final text vector, C is a parameter, $\|f\|$ is the norm of a final text vector, and E is an error between P and an actual label.

5. The computer-implemented method of 1, further comprising:
    calculating, by the computing system, the natural logarithm of P÷(1−P); and
    comparing, by the computing system, the calculated natural logarithm with a threshold to predict the class or label.

6. A computer-implemented method, comprising:
calculating, by a computing system, averaged local and global prediction scores for a mathematical representation of a plurality of words in a social media communication;
combining, by the computing system, the local and global prediction scores to obtain a single combined value S;
calculating, by the computing system, a probability P using:

$$P = \frac{1}{1 + e^{-(a+bS)}}$$

where a and b are both real numbers;
calculating, by the computing system, the natural logarithm of P÷(1−P); and
comparing, by the computing system, the calculated natural logarithm with a threshold to predict the class or label of the social media communication.

7. A computer program embodied on a non-transitory computer-readable medium, the program configured to cause at least one processor to:
process a social media communication comprising a plurality of words to convert each of the plurality of words of the communication into a mathematical representation;
calculate local and global prediction scores for the mathematical representation of the plurality of words in the social media communication;
combine the local and global prediction scores to obtain a single combined value;
predict a class or label of the social media communication using the combined value; and
when the predicted class or label is incorrect:
update a local model, and
recalculate the averaged local and global prediction scores using the updated local model and a global model, wherein
the local model is updated by updating each weight of the local model using one of the following equations:

$$w_i = w_i + f_i \frac{\text{sign}(E)(\max(|E|, 0))}{\|f\|^2 + 1/2C}$$

$$w_i = w_i + f_i \left( \frac{|E|}{\|f\|^2} \right)$$

$$w_i = w_i + f_i \left( \frac{\min(C, |E|)}{\|f\|^2} \right)$$

$$w_i = w_i + f_i \left( \frac{E}{\|f\|^2 + \frac{1}{2C}} \right)$$

where $f_i$ is an $i^{th}$ value of a final text vector, C is a parameter, $\|f\|$ is the norm of a final text vector, and E is an error between P and an actual label.

8. The computer program of claim 7, wherein the program is further configured to cause the at least one processor to update the local model and recalculate the averaged local and global prediction scores using the updated local model and the global model until the predicted class or label is correct.

9. The computer-implemented method of claim 7, wherein equations of the local model are implemented directly in code of the local model, reducing a size of the local model.

10. The computer program of claim 7, wherein the prediction of the class or label further comprises:
assigning a value of 0 to the class or label when the class or label is determined to be noise; and
assigning a value of 1 to the class or label when the class or label is determined to be actionable.

11. The computer program of claim 7, wherein the program is further configured to cause the at least one processor to:
determine whether the social media communication comprises an override word or phrase; and
when the override word or phrase is present in the social media communication, set the class or label of the social media communication to a class or label associated with the override word or phrase.

12. The computer program of claim 7, wherein the local and global prediction scores are calculated by adding vectors for each word to obtain a sum vector and dividing the sum vector by a total number of the words.

13. The computer program of claim 7, wherein when a mathematical representation of a word is not available in a dictionary, the computer program is further configured to cause the at least one processor to generate a random representation for the word.

14. The computer program of claim 7, wherein the global prediction score and local prediction score are combined by summing their values to obtain a single real number S.

15. The computer program of claim 14, the program further configured to cause the at least one processor to:
calculate a probability P using:

$$P = \frac{1}{1 + e^{-(a+bS)}}$$

where a and b are real numbers.

16. The computer program of claim 15, wherein a and b are both 1.

17. The computer program of claim 15, wherein the program is further configured to cause the at least one processor to:
calculate the natural logarithm of P÷(1−P); and
compare the calculated natural logarithm with a threshold to predict the class or label.

* * * * *